United States Patent
Ziese (10) Patent No.: US 6,567,917 B1
(45) Date of Patent: May 20, 2003

(54) METHOD AND SYSTEM FOR PROVIDING TAMPER-RESISTANT EXECUTABLE SOFTWARE

(75) Inventor: Kevin J. Ziese, Dripping Springs, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/241,249

(22) Filed: Feb. 1, 1999

(51) Int. Cl.[7] ................................................. H04L 9/00
(52) U.S. Cl. ......................... 713/187; 713/176; 380/30; 380/279
(58) Field of Search ................................ 713/176, 187; 380/30, 279

(56) References Cited

U.S. PATENT DOCUMENTS

| | | | | |
|---|---|---|---|---|
| 5,005,200 A | * | 4/1991 | Fischer ......................... 380/30 |
| 5,032,979 A | | 7/1991 | Hecht et al. ................. 364/200 |
| 5,101,402 A | | 3/1992 | Chiu et al. .................... 370/17 |
| 5,278,901 A | | 1/1994 | Shieh et al. ..................... 380/4 |
| 5,337,360 A | * | 8/1994 | Fischer ....................... 713/176 |
| 5,414,833 A | | 5/1995 | Hershey et al. ............. 395/575 |
| 5,448,724 A | | 9/1995 | Hayashi .................. 395/182.02 |
| 5,488,715 A | | 1/1996 | Wainwright ........... 395/182.02 |
| 5,524,238 A | | 6/1996 | Miller et al. ................. 395/600 |
| 5,557,742 A | | 9/1996 | Smaha et al. ............... 395/186 |
| 5,606,668 A | | 2/1997 | Shwed .................... 395/200.11 |
| 5,621,889 A | | 4/1997 | Lermuzeaux et al. ....... 395/186 |
| 5,699,513 A | | 12/1997 | Feigen et al. ........... 395/187.01 |
| 5,757,915 A | * | 5/1998 | Aucsmith et al. ............ 713/187 |
| 5,793,763 A | | 8/1998 | Mayes et al. ................ 370/389 |
| 5,796,942 A | | 8/1998 | Esbensen ............... 395/187.01 |
| 5,798,706 A | | 8/1998 | Kraemer et al. ........ 340/825.07 |
| 5,805,801 A | | 9/1998 | Holloway et al. ...... 395/187.01 |
| 5,826,014 A | | 10/1998 | Coley et al. ........... 395/187.01 |
| 5,919,257 A | | 7/1999 | Trostle ........................ 713/200 |
| 5,931,946 A | | 8/1999 | Terada et al. ................ 713/201 |
| 5,940,513 A | * | 8/1999 | Aucsmith et al. ........... 713/187 |
| 5,991,399 A | * | 11/1999 | Graunke et al. ............. 380/279 |
| 5,991,881 A | | 11/1999 | Conklin et al. .............. 713/201 |

OTHER PUBLICATIONS

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html).

(List continued on next page.)

*Primary Examiner*—Matthew Smithers
*Assistant Examiner*—Paul Callahan
(74) *Attorney, Agent, or Firm*—Baker Botts L.L.P.

(57) ABSTRACT

Tamper-resistant software is provided by determining an initial value of a specified property for an executable file. The executable file is then encrypted based on the initial value of the specified property. The initial value of the specified property is associated with the encrypted executable file and later used to decrypt the encrypted executable file. An execution-time value of the specified property is determined for the decrypted executable file. The execution-time value of the specified property is compared to the initial value of the specified property to determine whether tampering has occurred. The decrypted executable file is executed in response to the execution-time value of the specified property matching the initial value of the specified property.

5 Claims, 3 Drawing Sheets

OTHER PUBLICATIONS

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html).

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16, (found at http://www.cs.purdue.edu/coast/archive/data/categ30.html).

"Secure RPC Authentication (SRA) for Telnet and FTP", D.R. Safford, et al., pp. 1–5 (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages., (found at http://www.cs.purdue.edu/coast/archive/data/categ30.html).

"Characteristics of Wide–Area TCP/IP Conversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference,* Oct. 1991, pp. 362–371., (found at http://seclab.cs.ucdavis.edu/papers.html), 1991.

"Internetwork Security Monitor: An Intrusion–Detection System for Large–Scale Networks", L.T. Heberlein et al., *Proc. of the 15th National Computer Security Conference,* Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection Systems, S. Cheung et al., *U.C. Davis Computer Science Department Technical Report SCE–99–2, 1999,* pp. 1–47, (found at http://seclab.cs.ucdavis.edu/papers.html), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science,* vol. 1403 Springer–Verlat (1998) pp. 1–27, (found at http://seclab.cs.ucdavis.edu/papers.html), Oct. 17, 1998.

"Detecting Disruptive Routers: A Distributed Network Monitoring Approach", K.A. Bradley, et al., *Proceedings of the 1998 IEEE Symposium on Security and Privacy,* Oakland, CA, pp. 115–124 (found at http://seclab.cs.ucdavis.edu/papers.html), May 1998.

"Stack and Queue Integrity on Hostile Platforms", P.T. Devanbu, et al., *IEEE Symposium on Security and Privacy,* Oakland CA, (found at http://seclab.cs.ucdavis.edu/papers.html), 1998.

"Techniques for Trusted Software Engineering", P.T. Devanbu et al., *Proceedings of the 20th international Conference on Software Engineering,* Kyoto, Japan, (found at http://seclab.cs.ucdavis.edu/papers.html), 1998.

"Data Level Inference Detection in Database Systems", R.W. Yip et al., *Proceedings of the 11th IEEE Computer Security Foundations Workshop,* Rockport, Massachusetts, (found at http://seclab.cs.ucdavis.edu/papers.html), 1998.

"The Design and Implementation of a Data Level Database Inference Detection System",. Yip et al., *Proceedings of the Twelfth Annual IFIP WG 11.3 Working Conference on Database Security,* Chalkidiki, Greece 14 pages, (found at http://seclab.cs.ucdavis.edu/papers.html), 1998.

"Theft of Information in the Take–Grant Protection Model", Matt Bishop, 35 pages, *Journal of Computer Security* 4(4):(1996), (found at http://seclab.cs.ucdavis.edu/papers.html), Mar. 13, 1997.

"Information Survivability, Security, and Fault Tolerance", Matt Bishop, position paper for the Information Survivability Workshop *Journal of Computer Security #6*) 1 pages, (found at http://seclab.cs.ucdavis.edu/papers.html), 1997.

"Teaching Computer Security", Matt Bishop, position paper for the *Workshop on Education in Computer Security,* Monterey CA, 3 pages, (found at http://seclab.cs.ucdavis.edu/papers.html), 1997.

"Protecting Routing Infrastructures from Denial of Service Using Cooperative Intrusion Detection", S. Cheung et al., *Proc. new Security Paradigms Workshop,* Cumbria, UK 13 pages, (found at http://seclab.cs.ucdavis.edu/papers.html), 1997.

"An Efficient Message Authentication Scheme for Link State Routing", S. Cheung, *Proc. 13th annual Computer Security Applications Conference,* San Diego, CA, 9 pages, (found at http://seclab.cs.ucdavis.edu/papers.html), 1997.

"Cryptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html), 1997.

"Property–Based Testing; A New Approach to Testing for Assurance", Fink et al., *ACM SIGSOFT Software Engineering Notes,* 22(4):, (found at http://seclab.cs.ucdavis.edu/papers.html), 1997.

"Checking for Race Conditions in File Accesses", Bishop et al., *Computing Systems* 9(2), (found at http://seclab.cs.ucdavis.edu/papers.html), 1996.

"An Isolated Network for Research", Bishop et al., *The 19th NISSC,* pp. 1–9, (found at http://seclab.cs.ucdavis.edu/papers.html), 1996.

"Goal–Oriented Auditing and Logging", Bishop et al., submitted to IEEE Transactions on Computing Systems, (found at http://seclab.cs.ucdavis.edu/papers.html), 1996.

"Extending The Take–Grant Protection System", J. Frank et al., The IEEE Oakland Conference on Research in Security and Privacy., (found at http://seclab.cs.ucdavis.edu/papers.html), Dec. 5, 1996.

Network Security Via Reverse Engineering of TCP Code: Vulnerability Analysis and Proposed Solutions, Guha et al., *Proc. of the IEEE Infocom '96 ,* San Francisco, CA (found at http://seclab.cs.ucdavis.edu/papers.html), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security–Critical Programs In A Distributed System; A Specification––Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology–Eurocrypt '96,* LNCS vol. 1070, U. Maurer ed., Springer–Verlag, pp. 399–416, (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The $19^{th\ NISSC.}$* 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium,* San Jose, CA., (found at http://seclab.cs.ucdavis.edu/papers.html), 1996.

"A Standard Audit Trail Format", Matt Bishop, *Proc. of the 1995 NISSC,* Baltimore, MD., (found at http://seclab.cs.ucdavis.edu/papers.html), 1995.

Abstract entitled Theft of Information in the Take–Grant Protection Model, Matt Bishop, *Journal of Computer Security, vol. 3, No. 4,* (found at http://seclab.cs.ucdavis.edu/papers.html), 1995.

"Improving System Security via Proactive Password Checking", Matt Bishop, *Computers & Security,* vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC,* Baltimore, MD, 11 pages, (found at http://seclab.cs.ucdavis.edu/papers.html), 1995.

"Network Security Monitor", L. Todd Heberlein, *Lawrence Livermore National Laboratory project deliverable,* (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE-95-11,* (found at http://seclab.cs.ucdavis.edu/papers.html), 1995.

"MCF: A Malicious Code Filter", R.W. Lo et al., *Computers & Security,* (1995) vol. 14, No. 6. (27 pages.), (found at http://seclab.cs.ucdavis.edu/papers.html), 1995.

"Bucket Hashing and its Application to Fast Message Authentication", Phillip Rogaway, Advances in Cryptology—CRYPTO '95, (found at http://seclab.cs.ucdavis.edu/papers.html), 1995.

"Provably Secure Session Key Distribution–The Three Party Case", Bellare et al., *Proc., of the 27th Annual ACM Symposium on Theory of Computing,* Las Vegas, NV, (found at http://seclab.cs.ucdavis.edu/papers.html), 1995.

"XOR MACs: New Methods for Message Authentication Using Finite Pseudorandom Functions", Bellare et al., *Advances in Cryptology—CRYPTO '95,* (found at http://seclab.cs.ucdavis.edu/papers.html), Oct. 1995.

"Holding Intruders Accountable on the Interent", Staniford–Chen et al., *Proc. of the 1995 IEEE Symposium on Security and Privacy,* Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference,* 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium.* 10 pages, (found at http://seclab.cs.ucdavis.edu/papers.html),1994.

"Property–based Testing of Privileged Programs", Fink et al., *Proc. of the 10th Annual Computer Security Applications Conference,* Orlando, FL. 10 pages, (found at http://seclab.cs.ucdavis.edu/papers.html), Dec. 1994.

"Arificial Intelligence and Intrusion Detection: Current and Future Directions", Jeremy Frank, *Proc. of the 17th National Computer Security Conference.* 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference,* Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4,* San Diego, CA. 4 pages, (found at http://seclab.cs.ucdavis.edu/papers.html), 1994.

"Network Intrustion Detection", Mukherjee et al., *IEEE Network,* May–Jun. 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94,* 20 pages, (found at http://seclab.cs.ucdavis.edu/papers.html), 1994.

"The Security of Cipher Block Chaining", Bellare et al., *Advances in Cryptology—CRYPTO '94,* Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference or Computer and Communication Security.* Fairfax, VA, Nov. 1993, 11 pages, (found at http://seclab.cs.ucdavis.edu/papers.html), 1993.

"Entity Authentication and Key Distirbution". Bellare et al., *Advances in Cryptology—CRYPTO '93,* Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., *Proc. of the 1st ACM Conference on Computer and Communication Security,* Fairfax, VA, Nov. 1993, pp. 1545–164. (found at http://seclab.cs.ucdavis.edu/papers.html), 1993.

"A Software–Optimized Encryption Algorithm", Rogaway et al., *Proc. of the Fast Software Encryption Cambridge Security Workshop,* Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System–Motivation, Architecture, and An Early Prototype, Snapp et al., *Proc. 14th National Computer Security Conference,* Washington, DC (9 pages.) (found at http://seclab.cs.ucdavis.edu/papers.html), 1991.

"Proactive Password Checking", Matt Bishop, *Proc. of the 7th International Conference on Information Security,* May 1991, pp. 169–181. (found at http://seclab.cs.ucdavis.edu/papers.html), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience,* vol. 20, No. 5, May 1990. (found at http://seclab.cs.ucdavis.edu/papers.html), May 1990.

Abstract entitled "An Extendable Password Checker" by M. Bishop, *Proc. UNIX Security II* Portland, OR, 27–28 Aug. 1990, pp. 15–16, (found at http://seclab.cs.ucdavis.edu/papers.html), 1990.

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy,* Oakland, CA, May 7–9, 1990, pp. 86–94, (found at http://seclab.cs.ucdavis.edu/papers.html), May 1990.

Abstract entitled "A Network Security Monitor" by L.T. Heberlein, G.V. Dias, K.N. Levitt, B. Mukherjee, and others *Proc. of the 1990 IEE Symposium on Research in Security and Privacy,* Oakland, CA, May 7–9, 1990, pp. 296–304, (found at http://seclab.cs.ucdavis.edu/papers.html), May 1990.

Abstract entitled "Static Analysis Virus Detection Tools for UNIX Systems" by P. Kerchen, et al., *Proc. 13th National Computer Security Conference,* Washington, DC, Oct. 1–4, 1990, pp. 350–365 (found at http://seclab.cs.ucdavis.edu/papers.html), Oct. 1990.

Abstract entitled "Security with Low Communication Overhead" by D. Beaver, et al., *Proc. Advances in Cryptology–CRYPTO '90,* Santa Barbara, CA Aug. 11–15, Aug., 1990, pp. 62–76, (found at http://seclab.cs.ucdavis.edu/papers.html), Aug. 1990.

Abstract entitled "The Round Complexity of Secure Protocols" by D. Beaver, et al., *Proc. of the 22nd Annual ACM Symposium on Theory of Computing,* Baltimore, MD, May 14–16, 1990, pp. 503–513. (found at http://seclab.cs.ucdavis.edu/papers.html), May 1990.

Abstract entitled "PACLs: An Access Control List Approach to Anti–Viral Security" by D.R. Wichers, et al., *Proc. 13th National Computer Security Conference,* Washington, DC, Oct. 1–4, 1990, pp. 340–349. (found at http://seclab.cs.ucdavis.edu/papers.html), Oct. 1990.

Abstract entitled "Verification of Secure Distribuitied Systems in Higher Order Logic: A Modular Approach Using Generic Components" by J. Alves–Foss, K. Levitt, *Proc. of the 1991 IEEE Computer Society Symposium on Research in Security and Privacy,* Oakland CA May 20–22, 1991, pp. 122–135. (found at http://seclab.cs.ucdavis.edu/papers.html), May 1991.

Abstract entitled "An Authentication Mechanism for USENET" by M. Bishop, *Proc. of the Winter 1991 USENIX Conference.* Jan. 21–25, 1991, pp. 281–287, (found at http://seclab.cs.ucdavis.edu/papers.html), Jan. 1991.

Abstract entitled "Password Management" by M. Bishop, *COMPCON Spring '91. Digest of Papers,* San Francisco, CA, Feb. 25–Mar. 1, 1991, pp. 167–169. (found at http://seclab.cs.ucdavis.edu/papers.html), Mar. 1991.

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience.* vol. 4, No. 1, Mar. 1993, pp. 47–59. (found at http://seclab.cs.ucdavis.edu/papers.html), Mar. 1993.

Abstract entitled "A Modified Random Perturbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html), Mar. 1994.

Short presentation entitled "Intrusion Detection for Network Infrastructures" by S. Cheung, K.N. Levitt, C. Ko. *The 1995 IEEE Symposium on Security and Privacy,* Oakland CA, May 1995.

Master Thesis entitled "Paradigms for the Reduction of Audit Trails" by B. Wetmore, pp. i–6, Unable to obtain entire thesis—portion downloaded from http:seclab.cs.ucdavis.edu/papers.html, 1993.

"Open System Security—An Architectural Framework" by Arto T. Karila, (found at http://www/cs.purdue.edu/coast/archive/data/categ.30.html), May 1991.

Product description for "Oil Change" located on the internet at http://store.mcaffe.com/product.asp?ProductID=28&CCategoryID–12, pp. 1–2.

NetRander 1.3 User's Guide, Copyright © 1997 by WheelGroup Corporation, NetRanger product first available summer of 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11, (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, Copyright # 1990.

* cited by examiner

METHOD AND SYSTEM FOR PROVIDING TAMPER-RESISTANT EXECUTABLE SOFTWARE

TECHNICAL FIELD OF THE INVENTION

This invention relates generally to the field of computer security, and more particularly to a method and system for providing tamper-resistant executable software.

BACKGROUND OF THE INVENTION

Computer networks have become an increasingly important means for communicating public and private information between and within distributed locations. The Internet is one example of a public network commonly used for communicating public and private information. Internet web servers provide access to public information, such as news, business information and government information, which the Internet makes readily available around the world. The Internet is also becoming a popular forum for business transactions, including securities transactions and sales of goods and services. A large number of people have come to depend upon reliable Internet access and secure communications on a day-by-day and even second-by-second basis. Like the Internet, private networks also have become common means for communicating important information. Private networks, such as company intranets, local area networks (LANs), and wide area networks (WANs) generally limit access on a user-by-user basis and communicate data over dedicated lines or by controlling access through passwords, encryption or other security measures.

One danger to reliable and secure network communications is posed by hackers or other unauthorized users disrupting or interfering with network resources. The danger posed by unauthorized access to computer network resources can vary from simple embarrassment to substantial financial losses. For example, serious financial disruptions occur when hackers obtain financial account information or credit card information and use that information to misappropriate funds.

Typically, network administrators use various levels of security measures to protect the network against unauthorized use. Hackers, on the other hand, attempt to find and attack vulnerabilities of the security measures and network devices in order to obtain unauthorized entry to the computer network. Although sophisticated security measures can provide significant barriers to hackers, virtually any security measure can be breached through a vulnerability with enough effort.

SUMMARY OF THE INVENTION

The present invention provides tamper-resistant executable software that substantially eliminates or reduces disadvantages and problems associated with prior systems and methods. In particular, the software self-determines whether it has been tampered with and will refuse to execute if tampering is detected.

In accordance with one embodiment of the present invention, tamper-resistant software is provided by determining an initial value of a specified property for an executable file. The executable file is then encrypted based on the initial value of the specified property. The initial value of the specified property is associated with the encrypted executable file and later used to decrypt the encrypted executable file. An execution-time value of the specified property is determined for the decrypted executable file. The execution-time value of the specified property is compared to the initial value of the specified property to determine whether tampering has occurred. The decrypted executable file is executed in response to the execution-time value of the specified property matching the initial value of the specified property.

More particularly, in accordance with a particular embodiment of the present invention, an encrypted value of the specified property is determined for the encrypted executable file and inserted into the encrypted executable file along with the initial value of the specified property. During storage, the encrypted value may be periodically extracted and compared to a current value of the specified property for the encrypted executable file to determine if tampering has occurred. If tampering is detected during storage, prior to execution or during execution of the executable file, an alarm is generated to alert the operator to the tampering. In addition, the executable file may refuse to execute or terminate execution in response to detecting tampering. In this and other embodiments, the specified property may be a hash or check sum of file length.

Technical advantages of the present invention include providing tamper-resistant executable software. In particular, software, the only arbiter available at execution-time, self-determines whether or not unauthorized tampering has occurred. In addition, the software may self-determine whether unauthorized tampering has occurred during storage or execution of the software. As a result, applications into which viruses or other harmful code has been inserted will not execute.

Additional technical advantages of the present invention include providing a method and system by which a software provider may determine whether a customer has modified software in violation of a license agreement or such that the provider is not responsible for resulting problems or maintenance of the software. In particular, such modification with supplied software may cause the software to not execute or to generate an alarm. As a result, a software provider may be assured that customers are not modifying supplied software without authorization.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
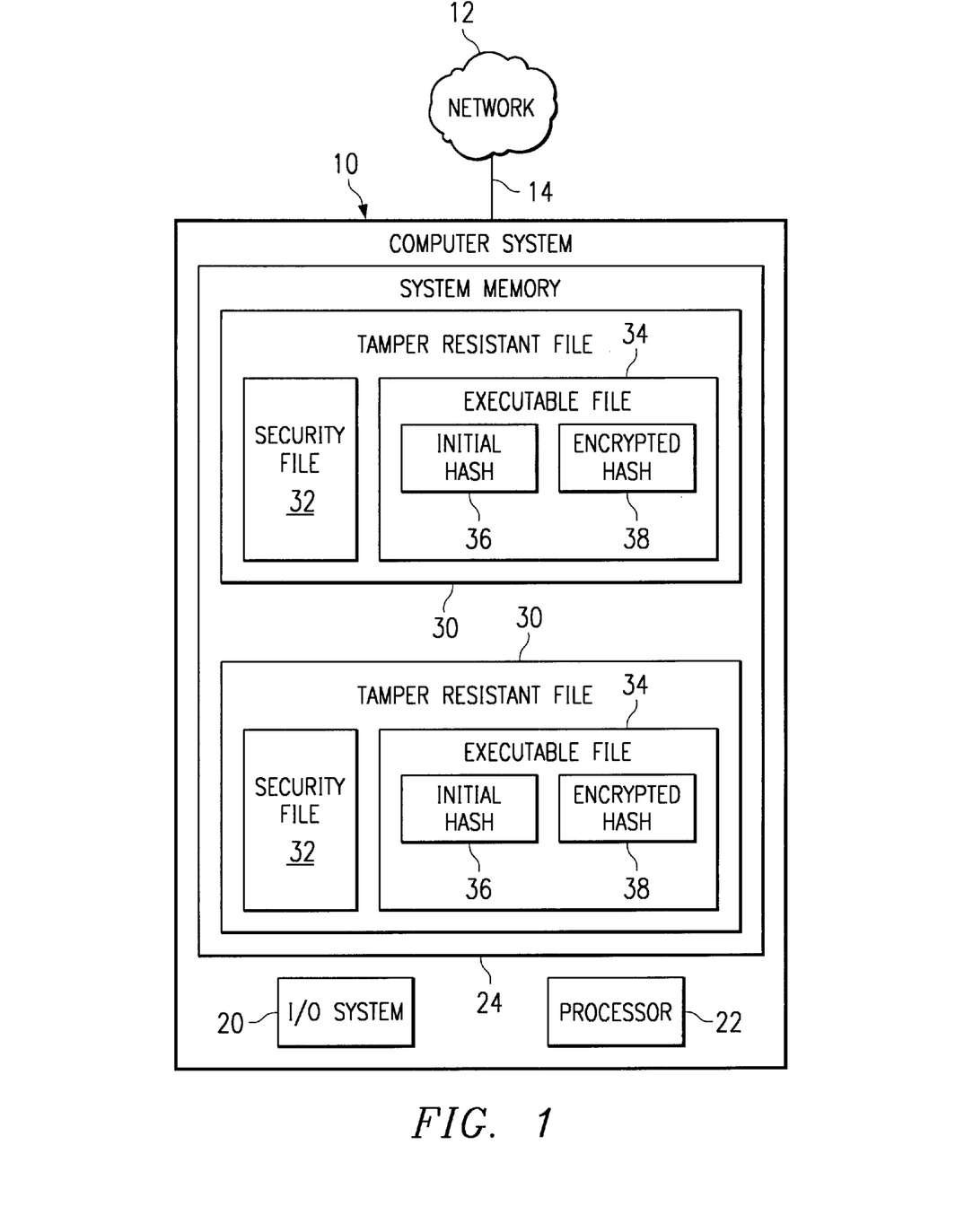
FIG. 1 is a block diagram illustrating a computer system including tamper-resistant executable software in accordance with one embodiment of the present invention.

FIG. 1 is a block diagram illustrating a computer system 10 having tamper-resistant executable software in accordance with one embodiment of the present invention. In this embodiment, the computer system 10 is connected to a network 12 through a communication line 14. The network 12 is a private Intranet, public Internet, or other suitable local or wide area network. The communication line 14 is any suitable type of communication link capable of supporting data transfer.

Referring to FIG. 1, the computer system 10 is a personal computer, file server, workstation, minicomputer, mainframe, or other general purpose or other computer capable of communicating and interconnecting with other computers. Generally described, the computer system 10 includes an input/output system 20, processor or processors 22, and system memory 24. Computer software is loaded into system memory 24 and executed by the processor 22. The computer software is generally identified by files, data values, and the like. It will be understood that the computer software may be otherwise combined and/or divided for processing without departing from the scope of the present invention. Accordingly, software labels are for illustrative purposes and may be suitably varied.

Software is stored in the computer system 10 as tamper-resistant files 30. The tamper-resistant files 30 may be generated by a software provider and transported to the client system 10 for use by a customer. The tamper-resistant files 30 may be transported by transmission over the network 12 or on a transportable storage medium, such as, for example, a floppy disk, a compact disk, or a magnetic tape. The tamper-resistant files 30 protect both the customer and the software provider from unauthorized modification of the files 30.

The tamper-resistant files 30 each include a security file 32 and an executable file 34. As described in more detail below, the security file 32 is executed in response to a request to execute the executable file 34 or other suitable event. The security file 32 determines whether tampering with the executable file 34 has occurred by addition, deletion, or other modification of the code for the executable file 34. In response to such tampering, the security file 32 generates an alarm indicating that tampering has occurred and, in one embodiment, refuses to execute the executable file 34. As a result, an operator will be notified of software into which viruses or other harmful code have been inserted and may replace the contaminated file.

The executable file 34 may be any suitable type of code capable of being executed. The executable file 34 is stored in an encrypted format as a barrier to tampering. In addition, the executable file 34 includes an initial value 36 of a specified property for the executable file 34 and an encrypted value 36 of the specified property for the encrypted executable file 34 in order to later determine whether the encrypted executable file 34 has nevertheless been modified from its initial state. The specified property is the hash, check sum, or other deterministic value of file length or other suitable file property capable of being used to determine whether a file has been modified from an initial state. The initial state may be any suitable previous state.

The initial and encrypted values 36 and 38 of the specified property are inserted into the encrypted executable file 34 after its encryption and are transported with the executed executable file 34. Accordingly, values 36 and 38 may be used at remote locations, such as the computer system 10, to determine whether tampering with the executable file 34 has occurred. It will be understood that the initial and encrypted values 36 and 38 may be otherwise suitably associated with the executable file 34, security file 32, or tamper-resistant file 30.

FIGS. 2–5 are a series of flow diagrams illustrating a computer method for providing tamper-resistant executable software in accordance with one embodiment of the present invention. In this embodiment, the specified property of a file is the hash of file length. The hash is a Message Digest 5 (MD5) hash, source hash algorithm (SHA), or any other suitable hash that is cryptographically strong. As previously described, although hashing is preferred because no two files can have the same hash, other suitable properties such as check sum values may be used.

Figure 2:
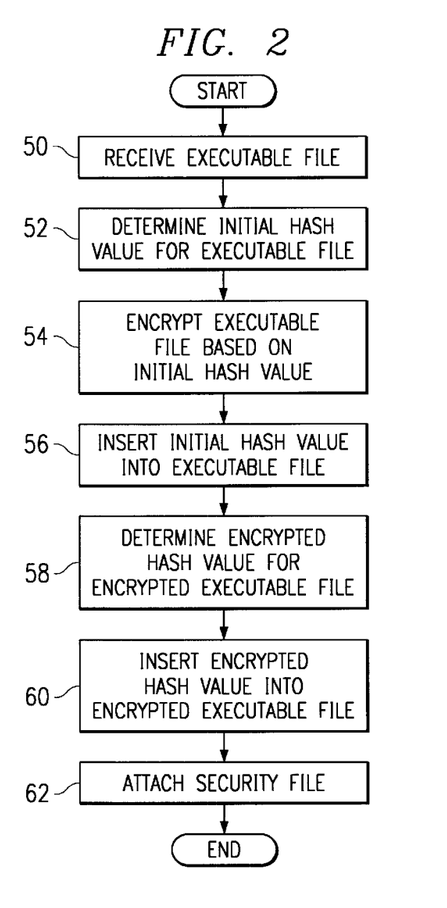
FIG. 2 is a flow diagram illustrating a computer method for generating tamper-resistant executable software in accordance with one embodiment of the present invention.

Referring to FIG. 2, a computer method is illustrated for generating the tamper-resistant software. The method begins at step 50 in which an executable file 34 is received. As previously described, the executable file 34 may be virtually any type of code capable of being executed by a computing device. Next, at step 52, an initial hash value 36 is determined for the executable file 34. At step 54, the executable file 34 is encrypted based on the initial hash value 36. The initial hash value 36 is then inserted into the encrypted executable file 34 at step 56. Accordingly, the initial hash value 36 will be transported with the encrypted executable file 34 and may be later used at a remote location to determine whether tampering has occurred to the executable file 34.

Proceeding to step 58, an encrypted hash value 38 is determined for the encrypted executable file 34. Next, at step 60, the encrypted hash value 38 is inserted into the encrypted executable file 34. Accordingly, the encrypted hash value 38 is also transported with the encrypted executable file 34 and may be later used to determine whether tampering with the executable file 34 has occurred. The initial and encrypted hash values 36 and 38 may each be one byte of data and stored at a predefined location or position within the encrypted execution file 34. As used herein, each means each of at least a subset of the identified items.

Next, at step 62, the security file 32 is attached to the encrypted executable file 34. In this way, the security file 32 remains with the executable file 34 to detect tampering. As previously described, the security file 32 generates an alarm in response to tampering and may refuse to execute the executable file 34. It will be understood that the security file 32 may be otherwise suitably coupled to the executable file 34 or may be an independent file separately downloaded and executed by the computer system 10. In any of these embodiments, the security file 32 is preferably distinct to allow updating without requiring any changes to the encrypted executable file 34. Step 62 leads to the end of the process at which point the tamper-resistant file 30 has been generated and may be downloaded or otherwise transported to the computer system 10 for storage and execution.

Figure 3:
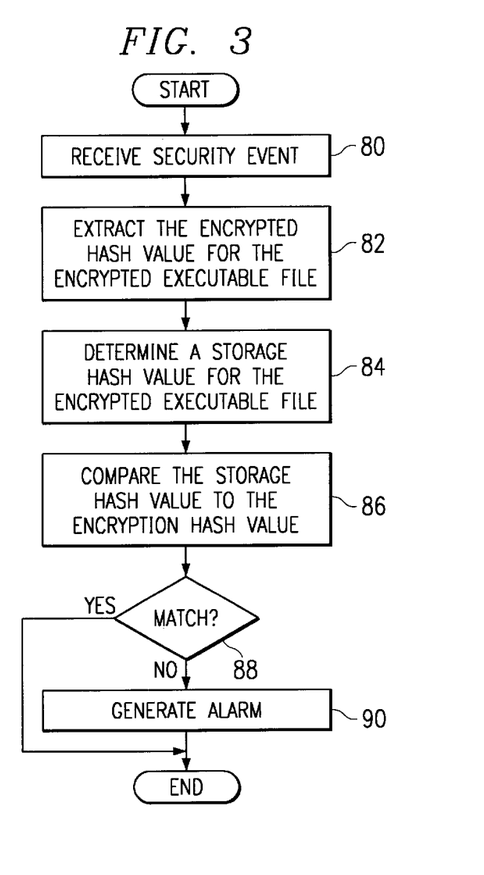
FIG. 3 is a flow diagram illustrating a computer method for determining whether the executable file of FIG. 1 has been tampered with during storage.

Referring to FIG. 3, a computer method is illustrated for determining whether the executable file 34 has been tampered with during storage on the computer system 10. For this aspect of the present invention, the security file 32 is a separate add-on or other program capable of inspecting the executable file 34 while it is at rest during storage.

The method begins at step 80 in which a security event is received by the security file 32. The security event may be a user request, a periodic event such that the executable file 34 is checked regularly for tampering, or in response to an unauthorized intrusion into the computer system 10.

Proceeding to step 82, the security file 32 extracts the encrypted hash value 38 from the encrypted executable file 34. Next, at step 84, the security file 32 determines a storage hash value for the encrypted executable file 34. The storage hash value is the then-current hash value for encrypted executable file 34. Next, at step 86, the security file 32 compares the storage hash value to the encrypted hash value 38 to determine whether the encrypted executable file 34 has been modified from its initial state.

At decisional step 88, if the storage and encrypted hash values match, then it is determined that tampering has not occurred and the Yes branch of decisional step 88 leads to the end of the process. However, if the storage and encrypted hash values do not match, then the encrypted executable file 34 has been tampered with and the No branch of decisional step 88 leads to step 90. At step 90, an alarm is generated to indicate that tampering with the encrypted executable file 34 has occurred. Accordingly, an operator may delete the contaminated file and acquire a new copy. Step 90 also leads to the end of the process at which point it has been determined whether tampering with the encrypted executable file 34 has occurred. It will be understood that such tampering during storage may be otherwise determined without departing from the scope of the present invention. For example, the encrypted executable file 34 may be decrypted and the initial hash value 36 used to determine whether tampering has occurred.

Figures 4, 5:
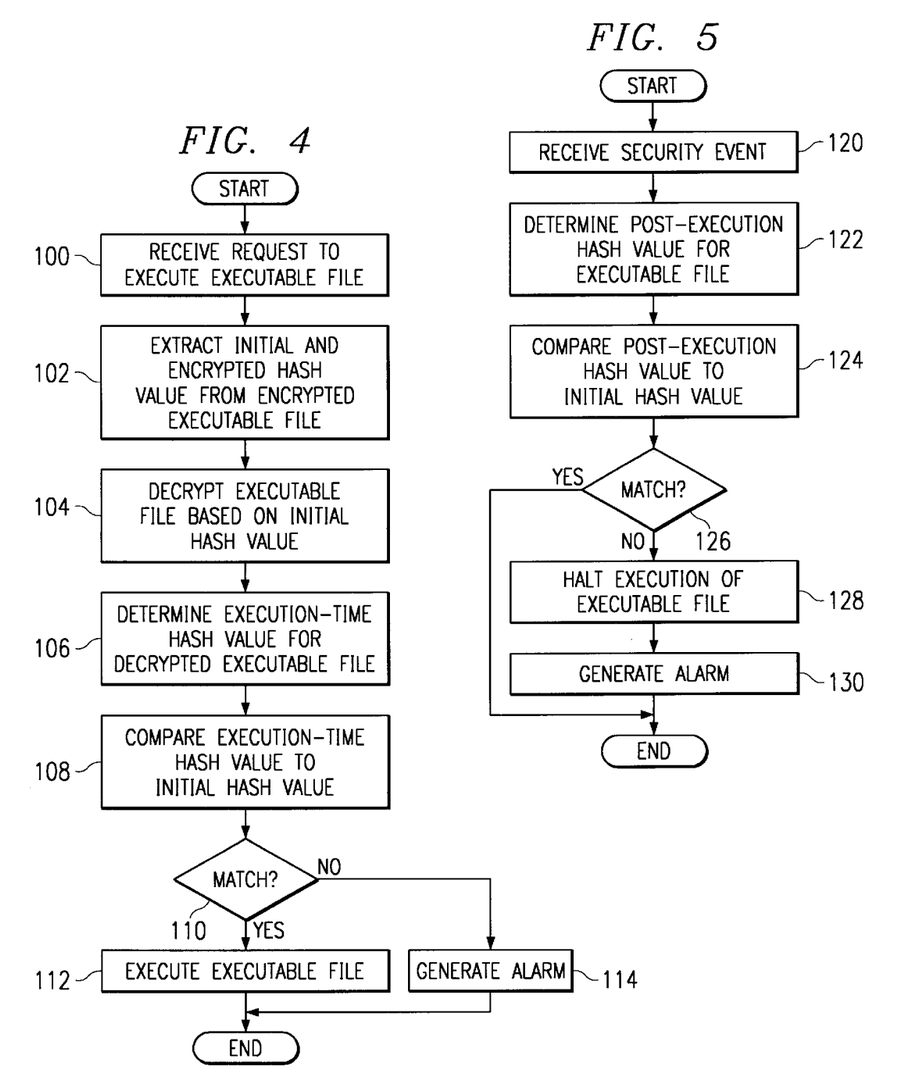
FIG. 4 is a flow diagram illustrating a computer method for executing the executable file of FIG. 1.
FIG. 5 is a flow diagram illustrating a computer method for determining whether the executable file of FIG. 1 has been tampered with during execution.

Referring to FIG. 4, a computer method is illustrated for executing the executable file 34. The method begins at step 100 in which a request is received to execute the executable file 34. In response, the tamper-resistant file 30 executes the security file 32 to first determine whether the executable file 34 has been tampered with or otherwise modified without authorization.

Proceeding to step 102, the security file 32 extracts the initial and encrypted hash values 36 and 38 from the encrypted executable file 34. Next, at step 104, the security file 32 decrypts the encrypted executable file 34 based on the initial hash value 36. At step 106, the security file 32 determines an execution-time hash value for the decrypted executable file 34. The execution-time hash value is the then-current hash value for the executable file 34. Differences between the execution-time hash value and the initial hash value 36 indicate that the executable file 34 has been modified from its initial state.

Proceeding to step 108, the security file 32 compares the execution-time hash value to the initial hash value 36 to determine whether tampering has occurred. Next, at decisional step 110, if the execution-time and initial hash values do not match, then the executable file 34 has been modified and the No branch of decisional step 110 leads to step 112. At step 112, the security file 32 generates an alarm to indicate to an operator that tampering with the executable file 34 has occurred.

Returning to decisional step 110, if the execution-time and initial hash values match, then it is determined that tampering with executable file 34 has not occurred and the Yes branch of decisional step 110 leads to step 114. At step 114, the security file 32 executes the executable file 34. Steps 112 and 114 each lead to the end of the process by which tampering with an executable file is self-determined by the file at execution time and the file will not execute unless it is determined that such tampering has not occurred. It will be understood that execution of the file may nevertheless be allowed with only the alarm being generated in response to detecting tampering with the file.

Referring to FIG. 5, a computer method is illustrated for determining whether the executable file 34 has been tampered with during execution. The method begins at step 120 in which a security event is received. As previously described, the security event may be a user request, a periodic event in order to check the executable file 34 at a specified frequency during execution, or in response to an unauthorized intrusion into the computer system 10.

Proceeding to step 122, the security file 32 determines a post-execution hash value for the executing executable file 34. The post-execution hash value is the then-current hash value for the executable file 34. Next, at step 124, the security file 32 compares the post-execution hash value to the initial hash value 36. A change in the hash value indicates that the executable file 34 has been modified.

Next, at decisional step 126, if the post-execution and initial hash values match, then it is determined that tampering has not occurred and the Yes branch of decisional step 126 leads to the end of the process. However, if the post-execution and initial hash values do not match, then tampering has occurred and the No branch of decisional step 126 leads to step 128.

At step 128, the security file 32 halts execution of the executable file 34 to prevent damage or further damage to the computer system 10. Next, at step 130, the security file 32 generates an alarm to notify the operator that tampering with the executable file 34 has been detected. Step 130 leads to the end of the process by which tampering with an executing file has been detected and execution of the file terminated. It will be understood that execution of the file may be allowed to continue with only an alarm being generated to notify the user of the tampering.

In accordance with the foregoing, tampering with an executable file may be detected during storage, at execution time, and during execution. As a result, applications into which viruses or other harmful code has been inserted will not execute. In addition, a software provider may determine whether a customer has modified software in violation of a license agreement or such that the provider is not responsible for resulting problems or maintenance of the software. Thus, a software provider may be assured that customers are not modifying supplied software without authorization.

Although the present invention has been described with several embodiments, various changes and modifications may be suggested to one skilled in the art. It is intended that the present invention encompass such changes and modifications as fall within the scope of the appended claims.

What is claimed is:

1. A method for providing tamper-resistant software, comprising:

receiving an executable file;

determining an initial hash value for the executable file;

encrypting the executable file based on the initial hash value;

inserting the initial hash value into the encrypted executable file;

determining an encrypted hash value for the encrypted executable file;

inserting the encrypted hash value into the encrypted executable file;

coupling a security file to the encrypted executable file for transport with the encrypted executable file;

transporting the encrypted executable file and the coupled security file to a remote location;

storing the encrypted executable file and the coupled security file at the remote location, wherein the security file is operable, while the encrypted executable filed is stored at the remote location, to:
- extract the encrypted hash value from the encrypted executable file;
- determine a storage hash value for the encrypted executable file;
- compare the storage hash value to the encrypted hash value;
- generate an alarm unless the storage hash value matches the encrypted hash value;

receiving a request to execute the encrypted executable file at the remote location; and in response to receiving a request to execute the encrypted executable file at the remote location, executing the security file, wherein the security file is operable to:
- extract the initial hash value from the encrypted executable file;
- decrypt the encrypted executable file based on the initial hash value;
- determine an execution-time hash value for the decrypted executable file;
- compare the execution-time hash value to the initial hash value; and
- prevent execution of the decrypted executable file unless the execution-time hash value matches the initial hash value.

2. The method of claim 1, further comprising during execution of the decrypted executable file at the remote location, the security file operable to:
- determine a post execution hash value for the executing executable file;
- compare the post execution hash value to the initial hash value; and
- terminate execution of the executing executable file unless the post execution hash value matches the initial hash value.

3. A system for providing tamper-resistant software, comprising:
- an executable file encrypted based on an initial value of a specified property for the executable file and including an encrypted value of the specified property;
- the initial value of the specified property stored within the encrypted executable file for transport with the encrypted executable file;
- a security file operable to be executed in response to a request for execution of the executable file, to extract the initial value of the specified property from the encrypted executable file, to decrypt the encrypted executable file based on the initial value of the specified property, to determine an execution-time value of the specified property for the decrypted executable file, to compare the execution-time value of the specified property to the initial value of the specified property, and to prevent execution of the executable file unless the execution-time value matches the initial value, wherein the security file is coupled to the encrypted executable file for transport with the encrypted executable file to a remote location; and
- the security file operable during storage of the encrypted executable file at the remote location to extract the encrypted value of the specified property, to determine a storage value of the specified property for the encrypted executable file, to compare the storage value of the specified property to the encrypted value of the specified property, and to generate an alarm unless the storage value matches the encrypted value.

4. The system of claim 3, further comprising:
- during execution of the decrypted executable file at the remote location, the security file operable to determine a post execution hash value for the executing executable file, to compare the post execution hash value to the initial hash value, and to terminate execution of the executing executable file unless the post execution hash value matches the initial hash value.

5. The system of claim 3, wherein the specified property is a hash of file length.

* * * * *

UNITED STATES PATENT AND TRADEMARK OFFICE
CERTIFICATE OF CORRECTION

PATENT NO.     : 6,567,917 B1
DATED          : May 20, 2003
INVENTOR(S)    : Kevin J. Ziese It is certified that error appears in the above-identified patent and that said Letters Patent is hereby corrected as shown below:

<u>Column 7,</u>
Line 6, after "executable" delete "filed" and insert -- file --.

Signed and Sealed this

Second Day of March, 2004

JON W. DUDAS
*Acting Director of the United States Patent and Trademark Office*